United States Patent
Horn et al.

(10) Patent No.: US 10,105,804 B2
(45) Date of Patent: Oct. 23, 2018

(54) FIXTURE SYSTEM AND METHOD FOR SECURING AN AIRFOIL DURING MATERIAL REMOVAL OPERATIONS

(71) Applicant: United Technologies Corporation, Hartford, CT (US)

(72) Inventors: Thomas J. Horn, Wallingford, CT (US); Kathleen Daudish, Marlborough, CT (US); Micah Beckman, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 367 days.

(21) Appl. No.: 14/857,988

(22) Filed: Sep. 18, 2015

(65) Prior Publication Data

US 2016/0107279 A1    Apr. 21, 2016

Related U.S. Application Data

(60) Provisional application No. 62/064,103, filed on Oct. 15, 2014.

(51) Int. Cl.
*B23Q 3/06* (2006.01)
*F01D 5/12* (2006.01)
(Continued)

(52) U.S. Cl.
CPC ............ *B23Q 3/063* (2013.01); *B23P 15/006* (2013.01); *F01D 5/12* (2013.01); *F01D 25/285* (2013.01);
(Continued)

(58) Field of Classification Search
CPC .......... F01D 25/285; F01D 25/28; F01D 5/12; F01D 5/30; F04D 29/38; F04D 29/388;
(Continued)

(56) References Cited

U.S. PATENT DOCUMENTS 4,033,569 A     7/1977   Dunn
5,964,016 A * 10/1999   Ito ............................ B23C 3/18
                                                 279/14

(Continued)

FOREIGN PATENT DOCUMENTS

CN       102950316 A     3/2013
CN       103878608 A     6/2014

(Continued)

OTHER PUBLICATIONS

English-Machine Translation of Hoehn Wolf et al. (WO 2011134903 A1), Nov. 3, 2011.*

(Continued)

*Primary Examiner* — Sarang Afzali
(74) *Attorney, Agent, or Firm* — Kinney & Lange, P.A.

(57) ABSTRACT

A method of removing material from an airfoil includes engaging a root of the airfoil within a root-securing fixture, engaging a tip of the airfoil within a tip-securing fixture, and removing material from the airfoil. The method further includes disengaging the tip of the airfoil from the tip-securing fixture to allow movement of the tip from a clamped state position to a free-state position. The method further includes reengaging the tip of the airfoil within the tip-securing fixture in the free-state position, and removing additional material from the airfoil.

16 Claims, 8 Drawing Sheets

(51) Int. Cl.
  *B23P 15/02* (2006.01)
  *B23P 15/04* (2006.01)
  *F04D 29/38* (2006.01)
  *B23P 15/00* (2006.01)
  *F01D 25/28* (2006.01)

(52) U.S. Cl.
  CPC .......... *F04D 29/38* (2013.01); *B23C 2215/44* (2013.01); *B23P 15/02* (2013.01); *B23P 15/04* (2013.01); *F05D 2230/10* (2013.01); *Y10T 29/49336* (2015.01); *Y10T 29/49341* (2015.01)

(58) Field of Classification Search
  CPC . F05D 2230/10; B23Q 3/063; B23C 2215/44; B23P 15/006; B25B 11/00; B25B 1/00; Y10T 29/37; Y10T 29/49718; Y10T 29/49721–29/49726
  See application file for complete search history.

(56) References Cited

U.S. PATENT DOCUMENTS

| | | | |
|---|---|---|---|
| 5,998,755 A | 12/1999 | Zajchowski et al. | |
| 6,068,541 A * | 5/2000 | Dwyer | B23Q 3/063 269/296 |
| 6,139,412 A | 10/2000 | Dwyer | |
| 6,652,369 B2 | 11/2003 | Jones et al. | |
| 6,820,468 B2 | 11/2004 | Powers et al. | |
| 6,830,240 B2 | 12/2004 | Jones et al. | |
| 7,219,408 B2 * | 5/2007 | Jones | B23Q 3/063 269/270 |
| 7,261,500 B2 * | 8/2007 | Killer | B23C 3/18 29/889.7 |
| 7,296,331 B2 * | 11/2007 | Mascarenas | B23Q 3/183 29/27 R |
| 2005/0268461 A1 | 12/2005 | Ouellette et al. | |
| 2014/0064974 A1 | 3/2014 | Simmons et al. | |

FOREIGN PATENT DOCUMENTS

| | | |
|---|---|---|
| EP | 0827807 A1 | 3/1998 |
| EP | 1422379 A2 | 5/2004 |
| EP | 2286960 A2 | 2/2011 |
| EP | 2703118 A2 | 3/2014 |
| WO | WO2011134903 A1 | 11/2011 |

OTHER PUBLICATIONS

English-Machien Translation of Liu et al. (CN 103878608 A), Jun. 25, 2014.*
European Search Report for European Patent Application No. 15189689.1, dated Apr. 6, 2016, 9 pages.

* cited by examiner

FIXTURE SYSTEM AND METHOD FOR SECURING AN AIRFOIL DURING MATERIAL REMOVAL OPERATIONS

CROSS-REFERENCE TO RELATED APPLICATION(S)

The application claims the benefit of U.S. Provisional Application No. 62/064,103, filed Oct. 15, 2014, for "Airfoil Material Removal" by Thomas J. Horn, Kathleen Daudish, and Micah Beckman.

BACKGROUND

This disclosure relates generally to turbomachinery, and in particular to manufacturing and machining of airfoils used in the turbomachinery.

Turbomachinery can provide efficient, reliable power for a wide range of applications, including aviation and industrial power generation. Aviation applications often include turbojet, turbofan, turboprop, and turboshaft engines. Gas turbine engines are rotary-type combustion turbine engines built around a power core made up of a compressor, combustor, and turbine arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, and are often utilized in a variety of counter-rotating and aft-mounted configurations.

Turbofan and turbojet engines are often subdivided into a number of stages, which are formed of alternating rows of rotor blade and stator vane airfoils. The airfoils are shaped to turn, accelerate, and compress the working fluid flow, or to generate lift for conversion to rotational energy in, e.g., a turbine. Accordingly, efficient engine performance depends upon precise control of the working fluid flow, including flow across fan, combustor, and turbine airfoils. Such precise control requires highly accurate manufacturing techniques to form the airfoil surfaces within specified design tolerances. To this end, material is typically removed from initially-forged or cast airfoils to meet design tolerances using sophisticated tooling systems, such as computer numerical control (CNC) machining systems. Often, the airfoil is secured within the tooling system using fixtures that prevent movement of the blade during material removal. However, in some cases, the airfoil can warp or otherwise deform upon release from the fixtures, possibly resulting in a finished airfoil that does not meet design specifications.

SUMMARY

In one example, a method of removing material from an airfoil comprises engaging a root of the airfoil within a root-securing fixture, engaging a tip of the airfoil within a tip-securing fixture, and removing material from the airfoil. The method further includes disengaging the tip of the airfoil from the tip-securing fixture to allow movement of the tip from a clamped-state position to a free-state position, reengaging the tip of the airfoil within the tip-securing fixture in the free-state position, and removing additional material from the airfoil.

In another example, a fixture system for securing an airfoil during material removal operations includes a root-securing fixture configured to engage a root of the airfoil, a tip-securing fixture configured to be selectively engageable and disengageable from a tip of the airfoil, and a control system. The control system is configured to cause the tip-securing fixture to engage the tip during initial removal of material from the airfoil and to disengage the tip after the initial removal of material to allow movement of the tip from a clamped-state position to a free-state position. The control system is further configured to cause the tip-securing fixture to reengage the tip in the free-state position during additional removal of material from the airfoil.

DETAILED DESCRIPTION

According to techniques of this disclosure, a fixture system can disengage a tip of an airfoil after initial material removal (e.g., during machining or other finishing operations), thereby helping to compensate for the release of internal stresses (e.g., forging stresses) resulting from the removal of the material. By disengaging the tip of the airfoil after the initial material removal (e.g., eighty to ninety percent of the material to be removed during the finishing operations), the fixture system can allow movement of the tip of the airfoil from a clamped-state position to a new, free-state position. Thereafter, the fixture system can reengage the tip in the free-state position for additional material removal (e.g., a remainder of the material to be removed during the finishing operations). That is, rather than reengage the airfoil by clamping the airfoil against an immobile hard-stop of the fixture that was used for initial material removal, a fixture system implementing techniques described herein can reengage the blade in the new, free-state position without causing significant deformation from the free-state position. In this way, a fixture system implementing techniques of this disclosure can help to minimize warping or other deformation of the airfoil due to internal stress relief resulting from the material removal process. Moreover, the fixture system can be automated to disengage and reengage the airfoil, thereby decreasing the amount of operator intervention (and the associated costs) required during the material removal process.

Figure 1:
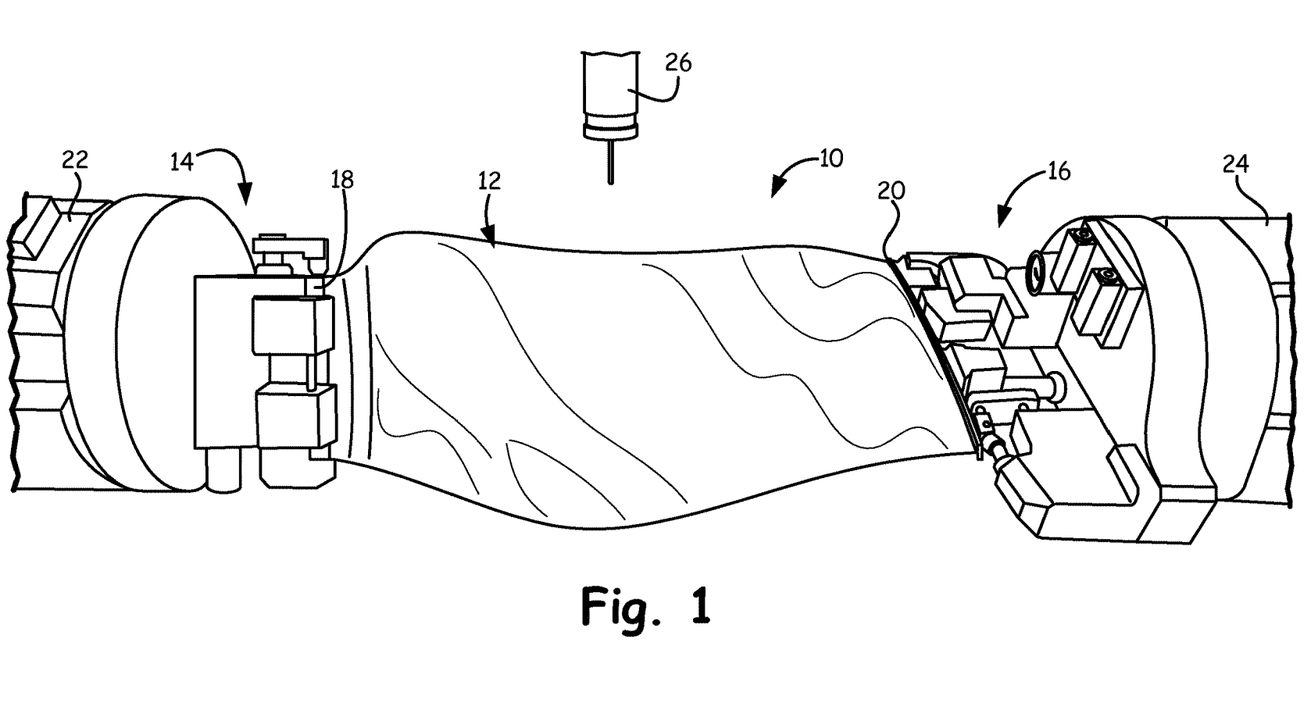
FIG. 1 is a perspective view of a fixture system that can be used for securing an airfoil during material removal operations.

FIG. 1 is a perspective view of fixture system 10 that can be used for securing airfoil 12 during material removal operations. As illustrated in FIG. 1, fixture system 10 can include root-securing fixture 14 and tip-securing fixture 16. Airfoil 12 can include root 18 and tip 20. Airfoil 12 can be, e.g., a rotor blade, such as a fan blade, compressor blade, turbine blade, or other airfoil formed of aluminum, titanium, or other lightweight material having high tensile strength properties. Root-securing fixture 14 can be configured to secure root 18 during the material removal process, such as by fixedly clamping or otherwise securing root 18. Tip-securing fixture 16 can be configured to selectively engage and disengage tip 20 during the material removal process, as is further described below.

Typically, airfoils used in turbomachinery are cast or forged to an initial form that approximates a final shape of the airfoil as defined by design specifications. Thereafter, the airfoil is subjected to a material removal process that removes excess material to shape the airfoil to meet the design specifications. For instance, as illustrated in FIG. 1, airfoil 12 can be secured (e.g., by root-securing fixture 14 and tip-securing fixture 16) within a milling machine, such as a computer numerical control (CNC) system that includes drills, lathes, cutters, or other tooling to remove excess material from the airfoil. As in the example of FIG. 1, root-securing fixture 14 and tip-securing fixture 16 can be connected to rotating headstocks 22 and 24, respectively. Each of rotating headstocks 22 and 24 can rotate (e.g., as controlled by a control system included in or coupled to the milling machine) about an axis of rotation that, in the example of FIG. 1, extends radially along a span of airfoil 12. In addition, each of headstocks 22 and 24 can be movable to provide six degrees of freedom during material removal by, e.g., tooling 26. While the material removal process is described in the example of FIG. 1 with respect to a milling machine, it should be appreciated that techniques of this disclosure are not so limited, but may be applicable to other material removal processes, such as electrical discharge machining (EDM) operations.

The initial casting or forging process can introduce internal stresses within airfoil 12. Removal of material from the cast/forged state can relieve such internal stresses, thereby causing warping or other deformation of airfoil 12 upon release from fixture system 10. Such deformation can be particularly pronounced at thinner parts of airfoil 12, such as at or near tip 20. Accordingly, as is further described below, tip-securing fixture 16 can be configured to disengage tip 20 after initial material removal from airfoil 12 to enable movement of tip 20 from a clamped-state position (i.e., a position of tip 20 prior to the initial material removal) to a new, free-state position (i.e., a position of tip 20 after initial material removal). As one example, the initial material removal can include eighty to ninety percent of the material to be removed from airfoil 12 during the material removal process, though other ranges are possible. Thereafter, tip-securing fixture 16 can reengage tip 20 in the free-state position for additional material removal, such as removal of a remainder of material to conform a shape of airfoil 12 to design specifications. As such, fixture system 10 can decrease an amount of deformation of airfoil 12 (e.g., at tip 20) due to the release of stresses internal to airfoil 12.

Figure 2:
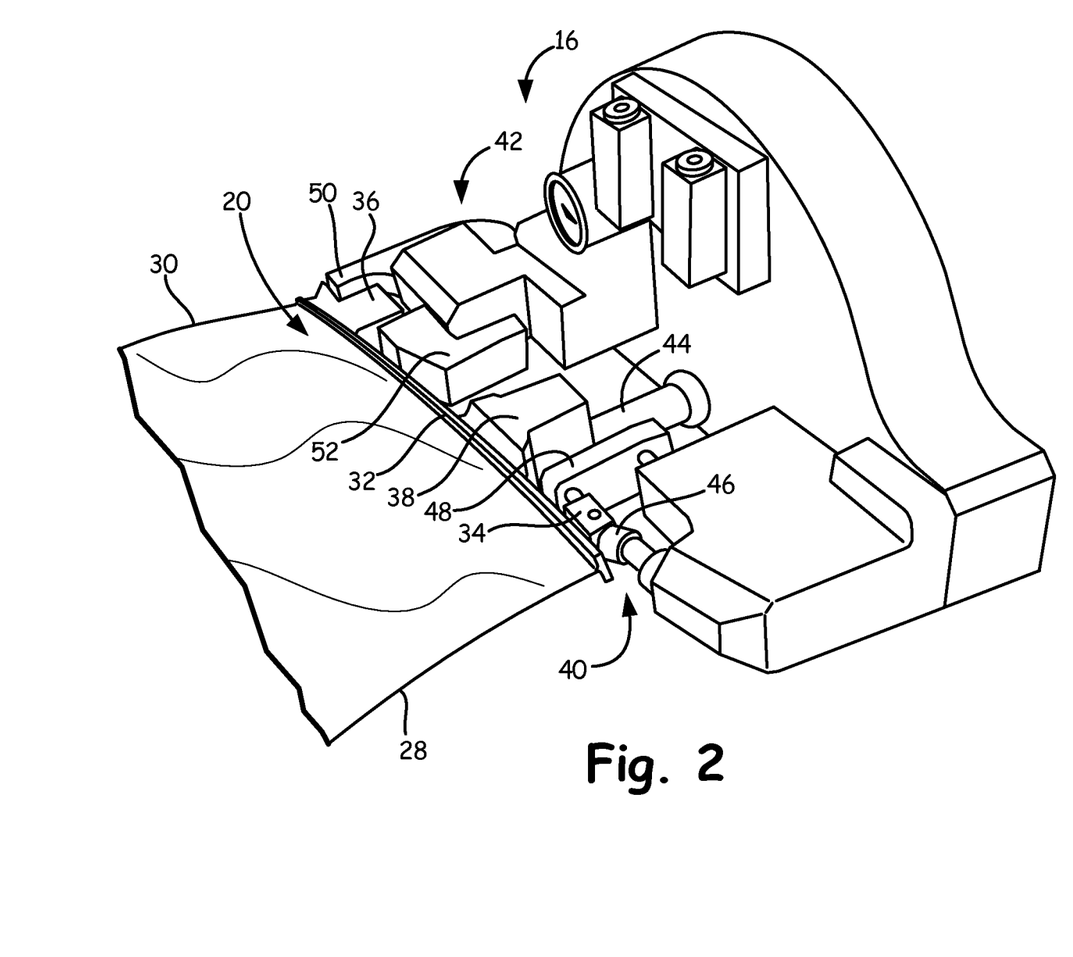
FIG. 2 is an enlarged perspective view of the tip-securing fixture of FIG. 1.

FIG. 2 is an enlarged perspective view of tip-securing fixture 16 of FIG. 1. As illustrated in FIG. 2, airfoil 12 can include leading edge 28 and trailing edge 30. Tip 20 of airfoil 12 can include radially outer edge 32. Each of leading edge tab 34, trailing edge tab 36, and center tab 38 extend from radially outer edge 32 and can be integrally formed from tip 20 during prior machining operations to facilitate interaction of tip-securing fixture 16 with airfoil 12. In other examples, one or more of tabs 34, 36, and 38 can be added to tip 20, such as by welding or other operations. Leading edge tab 34 is disposed proximate leading edge 28 of airfoil 12. Trailing edge tab 36 is disposed proximate trailing edge 30 of airfoil 12. Center tab 38 is disposed along radially outer edge 32 between leading edge tab 34 and trailing edge tab 36, such as at or near a central radial axis of airfoil 12.

As further illustrated in FIG. 2, tip-securing fixture 16 can include leading edge clamping assembly 40, trailing edge clamping assembly 42, and centering pin 44. Leading edge clamping assembly 40 includes leading edge positioning member 46 and leading edge clamping member 48. Trailing edge clamping assembly 42 includes trailing edge positioning member 50 and trailing edge clamping member 52.

Leading edge clamping assembly 40, trailing edge clamping assembly 42, and centering pin 44 are configured to be selectively engageable and disengageable from leading edge tab 34, trailing edge tab 36, and center tab 38, respectively. For instance, as is further described below, positioning member 46 is movable to engage and disengage a forward side of leading edge tab 34. Leading edge clamping member 48 is movable to engage and disengage an aft side of leading edge tab 34. Trailing edge positioning member 50 is movable to engage and disengage an aft side of trailing edge tab 36. Trailing edge clamping member is movable to engage and disengage a forward side of trailing edge tab 36. Centering pin 44 is movable to engage and disengage a bore (not illustrated) that extends radially inward from a radially outer side of center tab 38.

In operation, and as further described below, centering pin 44 engages center tab 38, leading edge clamping assembly 40 engages leading edge tab 34, and trailing edge clamping assembly 42 engages trailing edge tab 36 during initial material removal from airfoil 12. In response to a threshold amount of material removal (e.g., eighty to ninety percent of the material to be removed during the material removal process), centering pin 44 disengages center tab 38, leading edge clamping assembly 40 disengages leading edge tab 34, and trailing edge clamping assembly 42 disengages trailing edge tab 36 to allow movement of tip 20 from a clamped-state position to a new, free-state position. Thereafter, leading edge clamping assembly 40 and trailing edge clamping assembly 42 reengage leading edge tab 34 and trailing edge tab 36, respectively, during additional removal of material from airfoil 12. In some examples, centering pin 44 remains in a disengaged position (e.g., retracted from the bore of center tab 38) during the additional removal of material.

Figure 3:
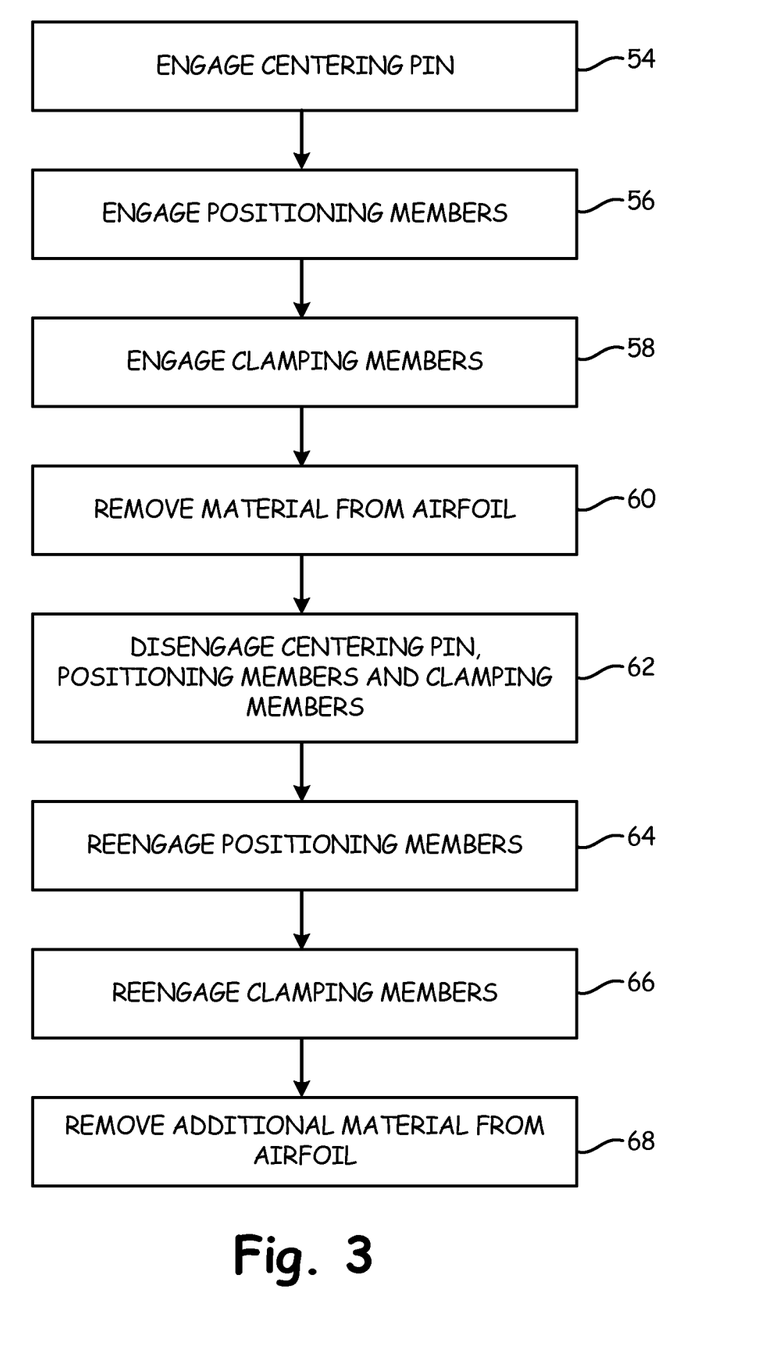
FIG. 3 is a flow diagram illustrating example operations of the fixture system of FIG. 1 to selectively engage and disengage the tip of the airfoil.

FIG. 3 is a flow diagram illustrating example operations of fixture system 10 to selectively engage and disengage tip 20 of airfoil 12. Further details of each of the example operations of FIG. 3 are described below with respect to the following figures.

Tip-securing fixture 16 can engage centering pin 44 with center tab 38 (step 54). Tip-securing fixture 16 can engage leading edge positioning member 46 with a forward side of leading edge tab 34, and can engage trailing edge positioning member 50 with an aft side of trailing edge tab 36 (step 56). Tip-securing fixture 16 can engage leading edge clamping member 48 with an aft side of leading edge tab 34, and can engage trailing edge clamping member 52 with a forward side of trailing edge tab 36 (step 58). Material can be removed from airfoil 12 (step 60). Tip-securing fixture 16 can disengage centering pin 44 from center tab 38, leading edge positioning member 46 from leading edge tab 34, leading edge clamping member 48 from leading edge tab 34, trailing edge positioning member 50 from trailing edge tab 36, and trailing edge clamping member 52 from trailing edge tab 36 to allow movement of tip 20 from a clamped-state position to a free-state position (step 62).

Tip-securing fixture 16 can reengage leading edge positioning member 46 with the forward side of leading edge tab 34 in the free-state position, and can reengage trailing edge positioning member 50 with the aft side of trailing edge tab 36 in the free-state position (step 64). Tip-securing fixture 16 can reengage leading edge clamping member 48 with the aft side of leading edge tab 34 in the free-state position, and can reengage trailing edge clamping member 52 with the forward side of trailing edge tab 36 in the free-state position (step 66). Additional material can be removed from airfoil 12 (step 68).

Figure 4:
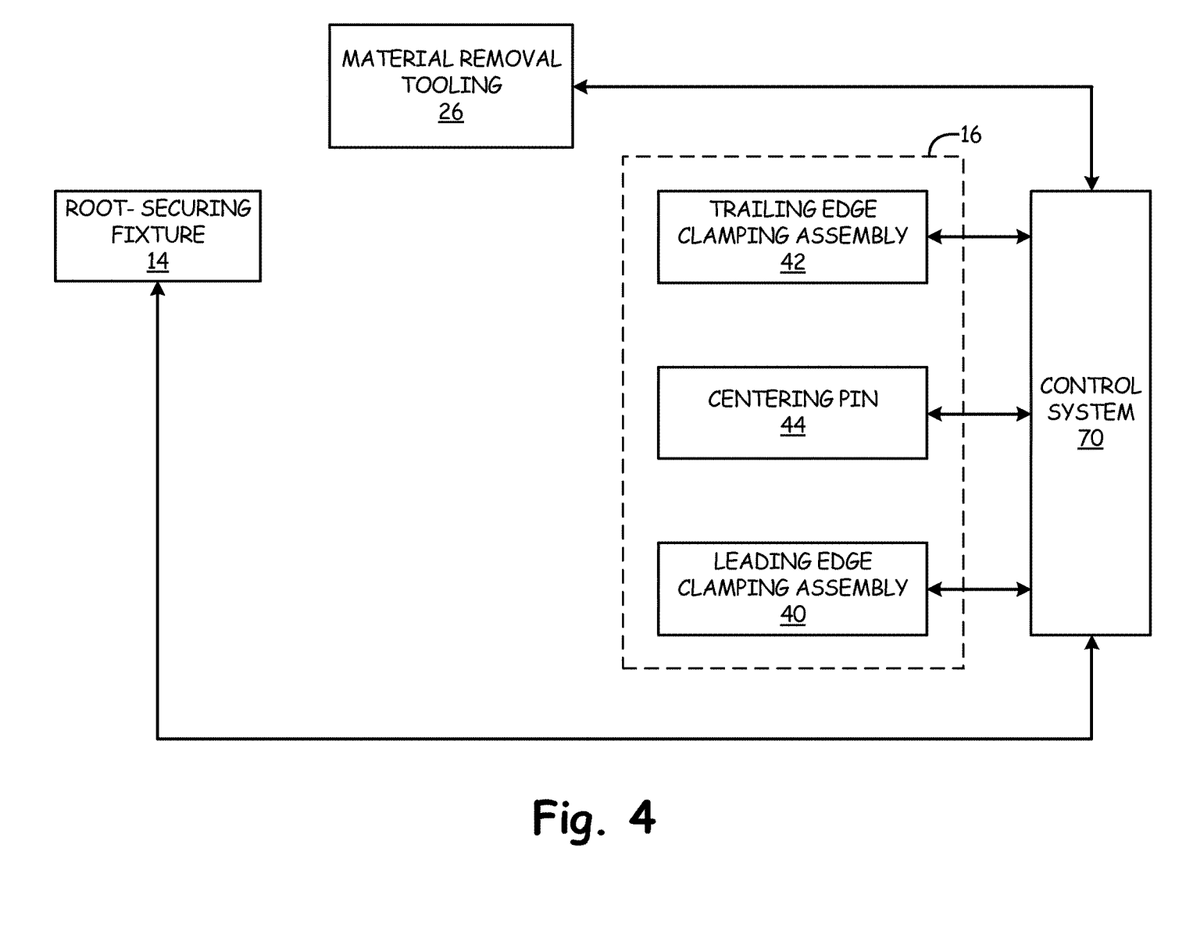
FIG. 4 is a schematic block diagram illustrating a control system that can be utilized for control of the fixture system of FIG. 1.

FIG. 4 is a schematic block diagram illustrating control system 70 that can be utilized for control of fixture system 10. Control system 70 can be any combination of software and/or hardware configured to control operation of fixture system 10 to selectively engage and disengage tip-securing fixture 16 with tip 20 of airfoil 12. Control system 70 can include, in some examples, one or more processors and computer-readable memory configured to store instructions that, when executed by the one or more processors, cause fixture system 10 to operate in accordance with techniques described herein.

Examples of one or more processors include any one or more of a microprocessor, a controller, a digital signal processor (DSP), an application specific integrated circuit (ASIC), a field-programmable gate array (FPGA), or other equivalent discrete or integrated logic circuitry. Computer-readable memory can include volatile memory, such as random access memories (RAM), dynamic random access memories (DRAM), static random access memories (SRAM), and other forms of volatile memories. In some examples, computer-readable memory can include non-volatile memory, such as magnetic hard discs, optical discs, floppy discs, flash memories, or forms of electrically programmable memories (EPROM) or electrically erasable and programmable memories (EEPROM). In certain examples, computer-readable memory can include a non-transitory medium. The term "non-transitory" can indicate that the storage medium is not embodied in a carrier wave or a propagated signal.

Control system 70 can, in some examples, be considered a controller device configured to control operation of fixture system 10 to secure airfoil 12 during a material removal process. In certain examples, control system 70 can be integrated with a material removal machine, such as a CNC milling machine. In other examples, control system 70 can be separate from, but communicatively coupled to, one or more of the material removal machine and fixture system 10.

As illustrated in FIG. 4, control system 70 can be coupled with material removal tooling 26, root-securing fixture 14, and leading edge clamping assembly 40, trailing edge clamping assembly 42, and centering pin 44 of tip-securing fixture 16. Such couplings can include any one or more of electrical couplings and communicative couplings (e.g., via a computer network). In general, control system 70 can include any combination of hardware and/or software configured to control operation of fixture system 10, such as to cause tip-securing fixture 16 to engage tip 20 during initial material removal, disengage tip 20 to allow movement of tip 20 from a clamped-state position to a free-state position, and to reengage tip 20 in the free-state position for additional material removal.

Figure 5A:
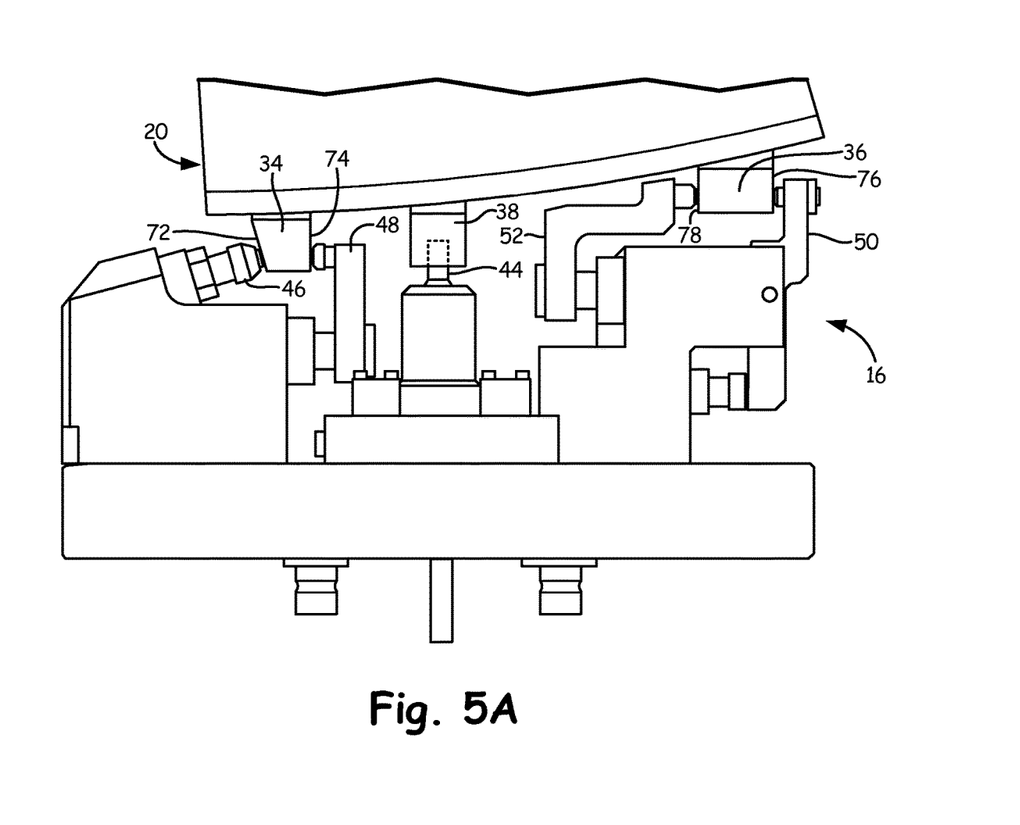
FIG. 5A is a perspective view of the tip-securing fixture of FIG. 1 engaged with a tip of an airfoil.
Figure 5B:
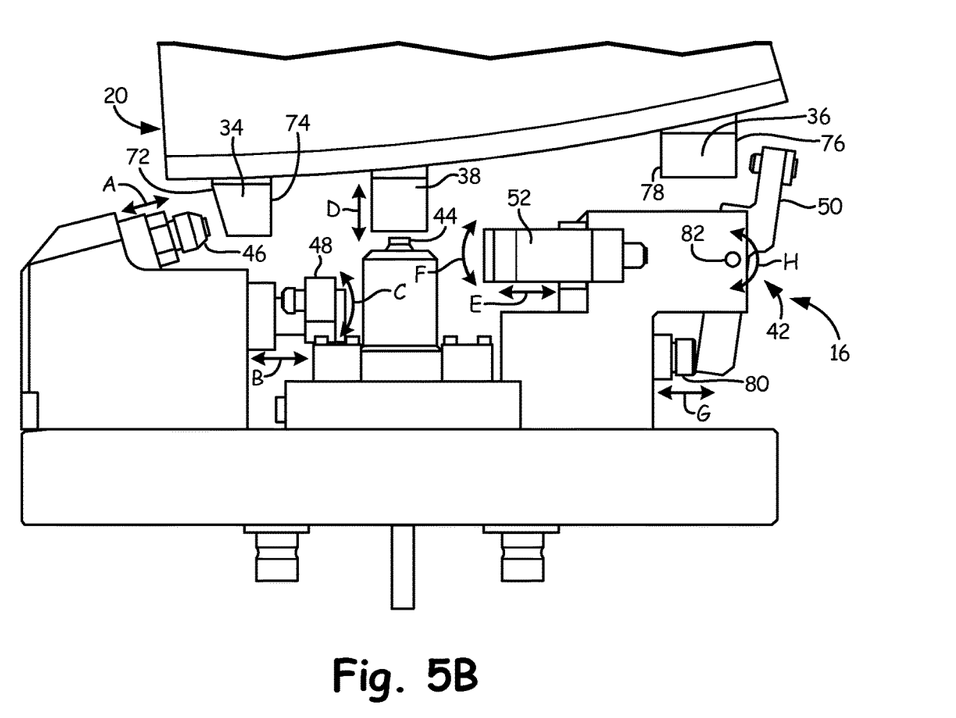
FIG. 5B is a perspective view of the tip-securing fixture of FIG. 5A disengaged from the tip of the airfoil.
Figure 5C:
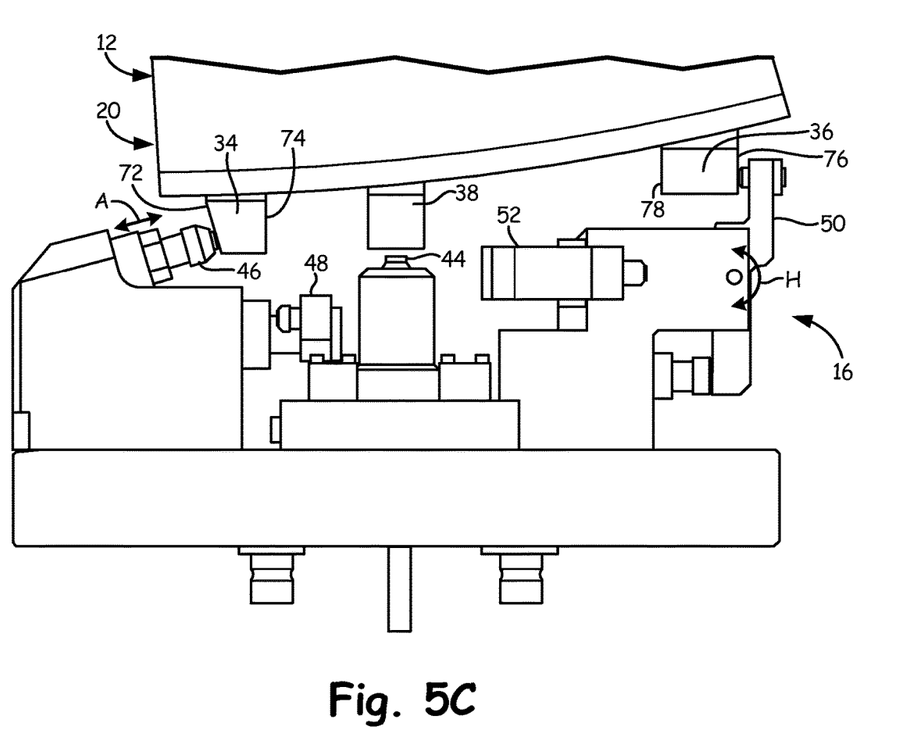
FIG. 5C is a perspective view of the tip-securing fixture of FIG. 5A illustrating positioning members reengaged with the tip of the airfoil.
Figure 5D:
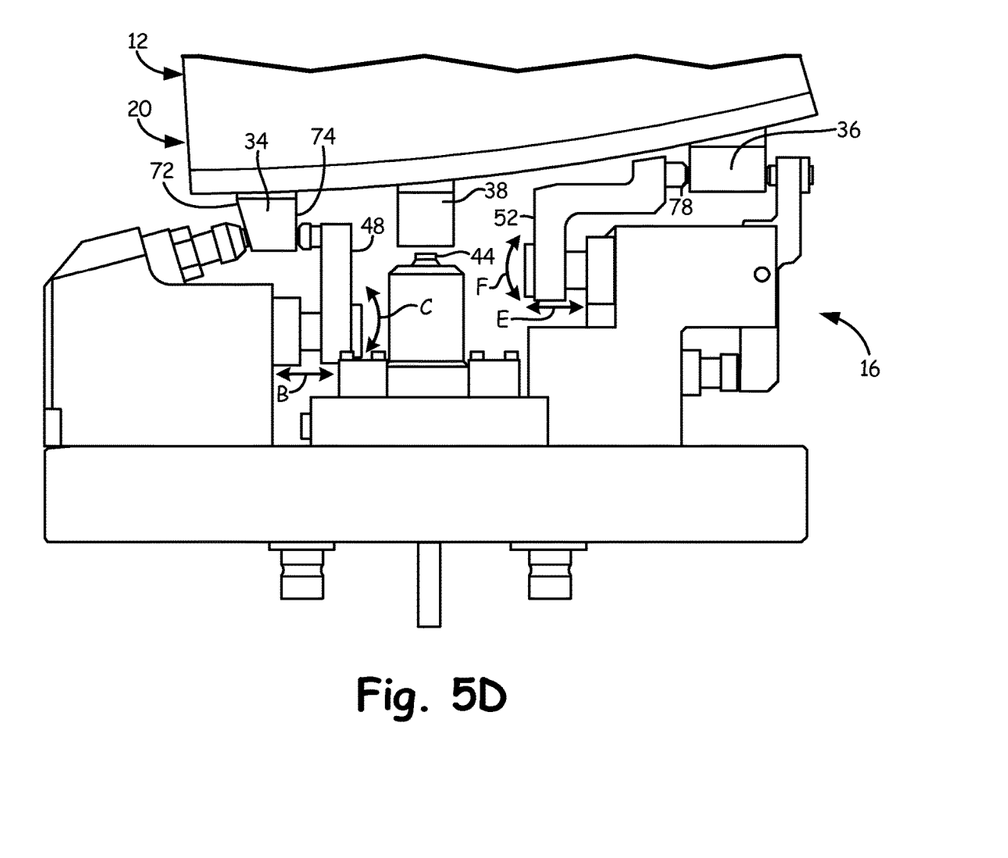
FIG. 5D is a perspective view of the tip-securing fixture of FIG. 5A illustrating clamping members reengaged with the tip of the airfoil.

FIGS. 5A-5D illustrate example states of tip-securing fixture 16 to engage, release, and reengage tip 20 of airfoil 12. Specifically, FIG. 5A illustrates an example of tip-securing fixture 16 engaged with tip 20, such as during initial material removal from airfoil 12. FIG. 5B illustrates an example of tip-securing fixture 16 disengaged from tip 20 to allow movement of tip 20 from a clamped-state position to a free-state position. FIG. 5C illustrates an example of tip-securing fixture 16 with leading edge positioning member 46 reengaged with leading edge tab 34 and trailing edge positioning member 50 reengaged with trailing edge tab 36 in the free-state position of tip 20. FIG. 5D illustrates an example of tip-securing fixture 16 with leading edge positioning member 46 and leading edge clamping member 48 engaged with leading edge tab 34, and trailing edge positioning member 50 and trailing edge clamping member 52 engaged with trailing edge tab 36 in the free-state position of tip 20.

FIG. 5A is a perspective view of tip-securing fixture 16 engaged with tip 20 of airfoil 12. As illustrated in FIG. 5A, leading edge positioning member 46 is engaged with forward side 72 of leading edge tab 34. Leading edge clamping member 48 is engaged with aft side 74 of leading edge tab 34. In operation, leading edge clamping member 48 applies force (e.g., ninety bars, one hundred bars, or other amounts of force) against leading edge tab 34 in a direction that is generally opposite leading edge positioning member 46, which may be locked into a stationary position upon engagement with forward side 72, as is further described below. In this way, leading edge clamping member 48 and leading edge positioning member 46 together act to apply a clamping force to leading edge tab 34 to secure leading edge tab 34 within tip-securing fixture 16.

As further illustrated in FIG. 5A, centering pin 44 is engaged within a bore of center tab 38 to engage centering pin 44 with center tab 38. Trailing edge positioning member 50 is engaged with aft side 50 of trailing edge tab 36. Trailing edge clamping member 52 is engaged with forward side 78 of trailing edge tab 36. In operation, trailing edge clamping member 52 applies force, such as ninety bars (approximately one-thousand three-hundred and five pounds per square inch), one hundred bars (approximately one-thousand four-hundred and fifty pounds per square inch), or other amounts of force against trailing edge tab 36 in a direction that is generally opposite trailing edge positioning member 50, which may be locked into a stationary position upon engagement with aft side 76, as is further described below. As such, trailing edge clamping member 52 and trailing edge positioning member 50 together act to apply a clamping force to trailing edge tab 36 to secure trailing edge tab 36 within tip-securing fixture 16.

FIG. 5B is a perspective view of tip-securing fixture 16 disengaged from tip 20 of airfoil 12. As illustrated in FIG. 5B, leading edge positioning member 46 is disengaged from forward face 72 of leading edge tab 34. Leading edge clamping member 48 is disengaged from aft face 74 of leading edge tab 34. Centering pin 44 is disengaged from center tab 38. Trailing edge positioning member 50 is disengaged from aft face 76 of trailing edge tab 36. Trailing edge clamping member 52 is disengaged from forward face 78 of trailing edge tab 36.

As illustrated, each of leading edge positioning member 46, leading edge clamping member 48, trailing edge positioning member 50, trailing edge clamping member 52, and centering pin 44 are movable to selectively engage and disengage tabs 34, 36, and 38. Each of leading edge positioning member 46, leading edge clamping member 48, trailing edge positioning member 50, trailing edge clamping member 52, and centering pin 44 can be pneumatically, hydraulically, or electrically actuated to induce such movement. As one example, tip-securing fixture 16 can include one or more of a pneumatic actuator, a hydraulic actuator, and an electrically-driven actuator (e.g., an electric motor) which can be driven by controller 70 (illustrated in FIG. 4) to cause movement of leading edge positioning member 46, leading edge clamping member 48, trailing edge positioning member 50, trailing edge clamping member 52, and centering pin 44. As another example, tip-securing fixture 16 can be connected to any one or more of a pneumatic, hydraulic, and electrical actuator, e.g., via electrical connections or supply lines.

Leading edge positioning member 46 is movable to extend and retract in the illustrated direction A. In operation, leading edge positioning member 46 retracts away from forward face 72 along direction A to disengage forward face 72. Leading edge clamping member 48 is movable to extend and retract in the illustrated direction B. In addition, leading edge clamping member 48 is rotatable in direction C. In operation, leading edge clamping member 48 extends away from aft face 74 along direction B to disengage aft face 74. Thereafter, leading edge clamping member 48 rotates in direction C to misalign with leading edge tab 34.

Centering pin 44 is movable to extend and retract in the illustrated direction D. In operation, centering pin 44 retracts from the bore in center tab 38 to disengage center tab 38. Trailing edge clamping member 52 is movable to extend and retract in direction E. In addition, trailing edge clamping member 52 is rotatable in direction F. In operation, trailing edge clamping member 52 extends away from forward face 78 along direction E to disengage forward face 78. Thereafter, trailing edge clamping member 52 rotates in direction F to misalign with trailing edge tab 36.

As illustrated in FIG. 5B, trailing edge clamping assembly 42 further includes actuator 80, which connects to trailing edge positioning member 50. Trailing edge positioning member 50 is connected to trailing edge clamping assembly via pivot 82. In operation, actuator 80 (e.g., a pneumatic actuator, a hydraulic actuator, an electrically driven actuator, or other type of actuator) is movable to extend and retract in direction G. Movement of actuator 80 along direction G causes rotation of trailing edge positioning member 50 in direction H via pivot 82. In operation, actuator 80 retracts in direction G to cause rotation of trailing edge positioning member 50 in direction H away from aft face 76 of trailing edge tab 36.

FIG. 5C is a perspective view of tip-securing fixture 16 illustrating leading edge positioning member 46 reengaged with forward face 72 of leading edge tab 34, and trailing edge positioning member 50 reengaged with aft face 76 of trailing edge tab 36. As illustrated in FIG. 5C, leading edge clamping member 48 is disengaged from aft face 74, trailing edge clamping member 52 is disengaged from forward face 78, and centering pin 44 is disengaged from center tab 38. In some examples, such as the example of FIG. 5C, leading edge positioning member 46 and trailing edge positioning member 50 can move to an engaged position before either of leading edge clamping member 48 and trailing edge clamping member 52 move to engagement positions.

For instance, as in the example of FIG. 5C, leading edge positioning member 46 can move along direction A into engagement with forward face 72 at a substantially same time as trailing edge positioning member 50 rotates in direction H into engagement with aft face 76. As such, a force applied by leading edge positioning member 46 and trailing edge positioning member 50 can be generally opposing in a direction substantially along a chord of airfoil 12, thereby minimizing any deformation due to the engagement of positioning members 46 and 50. In some examples, each of positioning members 46 and 50 can be maintained in a stationary position (e.g., "locked" into place) in response to application of a relatively small, threshold amount of force, such as a force of less than five Newtons (approximately one pound of force), though other threshold amounts of force are possible. Such a small application of force can enable positioning members 46 and 50 to effectively locate tabs 34 and 36, respectively, while airfoil 12 is in the free-state position and without causing substantial deformation of airfoil 12. By maintaining positioning members 46 and 50 in the stationary position (e.g., a locked position) in response to the application of the threshold amount of force, positioning members 46 and 50 can provide a counter force for clamping by leading edge clamping member 48 and trailing edge clamping member 52. For instance, clamping members 48 and 52 can each apply a relatively large clamping force, such as ninety to one hundred bars, although other ranges are possible. In this way, clamping members 48 and 52 can secure tip 20 in the free-state position without causing substantial deformation of airfoil 12 due to the applied clamping force.

FIG. 5D is a perspective view of tip-securing fixture 16 illustrating leading edge clamping member 48 reengaged with aft face 74 of leading edge tab 34 and trailing edge clamping member 52 reengaged with forward face 78 of trailing edge tab 36. As illustrated in FIG. 5D, centering pin 44 is disengaged from center tab 38. In some examples, such as the example of FIG. 5D, centering pin 44 can be maintained in a disengaged position during additional removal of material from airfoil 12, thereby compensating for movement of tip 20 that could misalign centering pin 44 from the bore in center tab 38.

In operation, leading edge clamping member 48 rotates in direction C to align with leading edge tab 34. Thereafter, leading edge clamping member 48 retracts along direction B to engage aft face 74 and apply a clamping force (e.g., one hundred bars of force). Trailing edge clamping member 52 rotates in direction F to align with trailing edge tab 36. Thereafter, trailing edge clamping member 52 retracts along direction E to engage forward face 78 and apply a clamping force (e.g., one hundred bars of force).

Accordingly, fixture system 10 implementing techniques of this disclosure can cause tip-securing fixture 16 to disengage tip 20 of airfoil 12 after initial removal of material to allow movement of tip 20 from a clamped-state position to a free-state position. Thereafter, fixture system 10 can cause tip-securing fixture 16 to reengage tip 20 for additional removal of material without causing significant deformation from the free-state position. As such, fixture system 10 can decrease a total amount of deformation of airfoil 12 caused by the release of internal stresses during the material removal process.

Discussion of Possible Embodiments

The following are non-exclusive descriptions of possible embodiments of the present invention.

A method of removing material from an airfoil includes engaging a root of the airfoil within a root-securing fixture, engaging a tip of the airfoil within a tip-securing fixture, and removing material from the airfoil. The method further includes disengaging the tip of the airfoil from the tip-securing fixture to allow movement of the tip from a clamped-state position to a free-state position, reengaging the tip of the airfoil within the tip-securing fixture in the free-state position, and removing additional material from the airfoil.

The method of the preceding paragraph can optionally include, additionally and/or alternatively, any one or more of the following features, configurations, operations, and/or additional components:

Engaging the tip of the airfoil within the tip-securing fixture can include engaging each of a plurality of tabs extending from a radially outer edge of the tip of the airfoil within the tip-securing fixture. Disengaging the tip of the airfoil from the tip-securing fixture can include disengaging each of the plurality of tabs from the tip-securing fixture.

The plurality of tabs can include a leading edge tab proximate a leading edge of the airfoil, a trailing edge tab proximate a trailing edge of the airfoil, and a center tab disposed between the leading edge tab and the trailing edge tab. The center tab can have a bore extending radially inward from a radially outer side of the center tab. The tip-securing fixture can include a leading edge clamping assembly configured to be selectively engageable and disengageable from the leading edge tab, a trailing edge clamping assembly configured to be selectively engageable and disengageable from the trailing edge tab, and a centering pin configured to be selectively inserted into and retracted from the bore of the center tab. Engaging the tip of the airfoil within the tip-securing fixture can include engaging the leading edge clamping assembly with the leading edge tab, engaging the trailing edge clamping assembly with the trailing edge tab, and inserting the centering pin into the bore of the center tab. Disengaging the tip of the airfoil from the tip-securing fixture can include disengaging the leading edge clamping assembly from the leading edge tab, disengaging the trailing edge clamping assembly from the trailing edge tab, and retracting the centering pin from the bore of the center tab.

Reengaging the tip of the airfoil within the tip-securing fixture can include engaging the leading edge clamping assembly with the leading edge tab and engaging the trailing edge clamping assembly with the trailing edge tab.

Reengaging the tip of the airfoil within the tip-securing fixture can include maintaining the centering pin in a disengaged state.

Engaging the centering pin in the bore of the centering tab can include moving the centering pin into the bore of the centering tab. Engaging the leading edge tab within the leading edge clamping assembly can include moving a leading edge positioning member of the leading edge clamping assembly into engagement with a forward side of the leading edge tab and moving a leading edge clamping member of the leading edge clamping assembly into engagement with an aft side of the leading edge tab. Engaging the trailing edge tab within the trailing edge clamping assembly can include moving a trailing edge positioning member of the trailing edge clamping assembly into engagement with an aft side of the trailing edge tab and moving a trailing edge clamping member of the trailing edge clamping assembly into engagement with a forward side of the trailing edge tab.

Both of the leading edge positioning member and the trailing edge positioning member can be moved into engagement before either of the leading edge clamping member and the trailing edge clamping member are moved into engagement.

Moving each of the leading edge clamping member and the trailing edge clamping member into engagement with the respective one of the leading edge tab and the trailing edge tab can include rotating each of the leading edge clamping member and the trailing edge clamping member into alignment with the respective one of the leading edge tab and the trailing edge tab prior to moving each of the leading edge clamping member and the trailing edge clamping member into engagement.

Moving the leading edge positioning member into engagement can include moving the leading edge positioning member into engagement with the forward side of the leading edge tab to apply a first force. Moving the leading edge clamping member into engagement can include moving the leading edge clamping member into engagement with the aft side of the leading edge tab to apply a second force. The second force can be greater than the first force. Moving the trailing edge positioning member into engagement can include moving the trailing edge positioning member into engagement with the aft side of the trailing edge tab to apply a third force. Moving the trailing edge clamping member into engagement can include moving the trailing edge clamping member into engagement with the forward side of the trailing edge tab to apply a fourth force. The fourth force can be greater than the third force.

Moving the leading edge positioning member into engagement with the forward side of the leading edge tab can include maintaining the leading edge positioning member in a stationary position in response to application of a first threshold amount of force. Moving the trailing edge positioning member into engagement with the aft side of the trailing edge tab can include maintaining the trailing edge positioning member in a stationary position in response to application of a second threshold amount of force.

A fixture system for securing an airfoil during material removal operations includes a root-securing fixture configured to engage a root of the airfoil, a tip-securing fixture configured to be selectively engageable and disengageable from a tip of the airfoil, and a control system. The control system is configured to cause the tip-securing fixture to engage the tip during initial removal of material from the airfoil and to disengage the tip after the initial removal of material to allow movement of the tip from a clamped-state position to a free-state position. The control system is further configured to cause the tip-securing fixture to reengage the tip in the free-state position during additional removal of material from the airfoil.

The fixture system of the preceding paragraph can optionally include, additionally and/or alternatively, any one or more of the following features, configurations, operations, and/or additional components:

The control system can be configured to cause the tip-securing fixture to engage the tip during the initial removal of material by causing the tip-securing fixture to engage each of a plurality of tabs extending from a radially outer edge of the tip of the airfoil within the tip-securing fixture. The control system can be configured to cause the tip-securing fixture to disengage the tip after the initial removal of material by causing the tip-securing fixture to disengage each of the plurality of tabs from the tip-securing fixture.

The plurality of tabs can include a leading edge tab proximate a leading edge of the airfoil, a trailing edge tab proximate a trailing edge of the airfoil, and a center tab disposed between the leading edge tab and the trailing edge tab. The center tab can have a bore extending radially inward from a radially outer side of the center tab. The tip-securing fixture can include a leading edge clamping assembly configured to be selectively engageable and disengageable from the leading edge tab, a trailing edge clamping assembly configured to be selectively engageable and disengageable from the trailing edge tab, and a centering pin configured to be selectively inserted into and retracted from the bore of the center tab. The control system can be configured to cause the tip-securing fixture to engage each of a plurality of tabs by causing the leading edge clamping assembly to engage the leading edge tab, the trailing edge clamping assembly to engage the trailing edge tab, and the centering pin to insert into the bore of the center tab. The control system can be configured to cause the tip-securing fixture to disengage each of the plurality of tabs by causing the leading edge clamping assembly to disengage from the leading edge tab, the trailing edge clamping assembly to disengage from the trailing edge tab, and the centering pin to retract from the bore of the center tab.

The control system can be configured to cause the tip-securing fixture to reengage the tip in the free-state position during the additional removal of material by causing the leading edge clamping assembly to engage the leading edge tab and the trailing edge clamping assembly to engage the trailing edge tab.

The control system can be configured to cause the tip-securing fixture to reengage the tip in the free-state position during the additional removal of material by maintaining the centering pin in a disengaged state.

The leading edge clamping assembly can include a leading edge positioning member and a leading edge clamping member. The trailing edge clamping assembly can include a trailing edge positioning member and a trailing edge clamping member. The control system can be configured to cause the centering pin to insert into the bore of the centering tab by causing the centering pin to move into the bore of the centering tab. The control system can be configured to cause the leading edge clamping assembly to engage the leading edge tab by causing the leading edge positioning member to move into engagement with a forward side of the leading edge tab and causing the leading edge clamping member to move into engagement with an aft side of the leading edge tab. The control system can be configured to cause the trailing edge clamping assembly to engage the trailing edge tab by causing the trailing edge positioning member to move into engagement with an aft side of the trailing edge tab and causing the trailing edge clamping member to move into engagement with a forward side of the trailing edge tab.

The control system can be configured to cause both the leading edge positioning member and the trailing edge positioning member to move into engagement before causing either of the leading edge clamping member and the trailing edge clamping member into engagement.

The control system can be configured to cause each of the leading edge clamping member and the trailing edge clamping member to move into engagement with the respective one of the leading edge tab and the trailing edge tab by causing each of the leading edge clamping member and the trailing edge clamping member to rotate into alignment with the respective one of the leading edge tab and the trailing edge tab prior to causing each of the leading edge clamping member and the trailing edge clamping member to move into engagement.

The control system can be configured to cause the leading edge positioning member to move into engagement by causing the leading edge positioning member to move into engagement with the forward side of the leading edge tab to apply a first force. The control system can be configured to cause the leading edge clamping member to move into engagement by causing the leading edge clamping member to move into engagement with the aft side of the leading edge tab to apply a second force, the second force greater than the first force. The control system can be configured to cause the trailing edge positioning member to move into engagement by causing the trailing edge positioning member to move into engagement with the aft side of the trailing edge tab to apply a third force. The control system can be configured to cause the trailing edge clamping member to move into engagement by causing the trailing edge clamping member to move into engagement with the forward side of the trailing edge tab to apply a fourth force, the fourth force greater than the third force.

The control system can be configured to cause the leading edge positioning member to remain in a stationary position in response to application of a first threshold amount of force during engagement with the forward side of the leading edge tab. The control system can be configured to cause the trailing edge positioning member to remain in a stationary position in response to application of a second threshold amount of force during engagement with the aft side of the trailing edge tab.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of removing material from an airfoil, the method comprising:
   engaging a root of the airfoil within a root-securing fixture;
   controlling, by a control system, a tip-securing fixture to:
      engage a tip of the airfoil within the tip-securing fixture during initial removal of material from the airfoil;
      disengage the tip of the airfoil from the tip-securing fixture after the initial removal of material to allow movement of the tip from a clamped state position to a free-state position;
      reengage the tip of the airfoil within the tip-securing fixture in the free-state position during additional removal of material from the airfoil;
   wherein controlling the tip-securing fixture to engage the tip of the airfoil within the tip-securing fixture during initial removal of material comprises controlling the tip-securing fixture to engage each of a plurality of tabs extending from a radially outer edge of the tip of the airfoil within the tip-securing fixture;
   wherein controlling the tip-securing fixture to disengage the tip of the airfoil from the tip-securing fixture after the initial removal of material comprises controlling the tip-securing fixture to disengage each of the plurality of tabs from the tip-securing fixture;
   wherein the plurality of tabs comprises a leading edge tab proximate a leading edge of the airfoil, a trailing edge tab proximate a trailing edge of the airfoil, and a center tab disposed between the leading edge tab and the trailing edge tab, the center tab having a bore extending radially inward from a radially outer side of the center tab;

wherein the tip-securing fixture comprises a leading edge clamping assembly configured to be selectively engageable and disengageable from the leading edge tab, a trailing edge clamping assembly configured to selectively engageable and disengageable from the trailing edge tab, and a centering pin configured to be selectively inserted into and retracted from the bore of the center tab;

wherein controlling the tip-securing fixture to engage the tip of the airfoil comprises controlling the tip-securing fixture to cause the leading edge clamping assembly to engage the leading edge tab, the trailing edge clamping assembly to engage the trailing edge tab, and the centering pin to insert into the bore of the center tab; and wherein controlling the tip-securing fixture to disengage the tip of the airfoil comprises controlling the tip-securing fixture to disengage each of the plurality of tabs by causing the leading edge clamping assembly to disengage from the leading edge tab, the trailing edge clamping assembly to disengage from the trailing edge tab, and the centering pin to retract from the bore of the center tab.

2. The method of claim 1, wherein controlling the tip-securing fixture to insert the centering pin into the bore of the centering tab comprises controlling the tip-securing fixture to move the centering pin into the bore of the centering tab;

wherein controlling the tip-securing fixture to engage the leading edge tab within the leading edge clamping assembly comprises controlling the tip-securing fixture to move a leading edge positioning member of the leading edge clamping assembly into engagement with a forward side of the leading edge tab and to move a leading edge clamping member of the leading edge clamping assembly into engagement with an aft side of the leading edge tab; and wherein controlling the tip-securing fixture to engage the trailing edge tab within the trailing edge clamping assembly comprises controlling the tip-securing fixture to move a trailing edge positioning member of the trailing edge clamping assembly into engagement with an aft side of the trailing edge tab and to move a trailing edge clamping member of the trailing edge clamping assembly into engagement with a forward side of the trailing edge tab.

3. The method of claim 2, wherein controlling the tip-securing fixture to engage the leading edge tab within the leading edge clamping assembly comprises controlling the tip-securing fixture to move the leading edge positioning member into engagement with the leading edge clamping assembly before either of the leading edge clamping member and the trailing edge clamping member are moved into engagement; and wherein controlling the tip-securing fixture to engage the trailing edge tab within the trailing edge clamping assembly comprises controlling the tip-securing fixture to move the trailing edge positioning member into engagement with the trailing edge clamping assembly before either of the leading edge clamping member and the trailing edge clamping member are moved into engagement.

4. The method of claim 2, wherein controlling the tip-securing fixture to move each of the leading edge clamping member and the trailing edge clamping member into engagement with the respective one of the leading edge tab and the trailing edge tab comprises controlling the tip-securing fixture to rotate each of the leading edge clamping member and the trailing edge clamping member into alignment with the respective one of the leading edge tab and the trailing edge tab prior to controlling the tip-securing fixture to move each of the leading edge clamping member and the trailing edge clamping member into engagement.

5. The method of claim 2, wherein controlling the tip-securing fixture to move the leading edge positioning member into engagement comprises controlling the tip-securing fixture to move the leading edge positioning member into engagement with the forward side of the leading edge tab to apply a first force;

wherein controlling the tip-securing fixture to move the leading edge clamping member into engagement comprises controlling the tip-securing fixture to move the leading edge clamping member into engagement with the aft side of the leading edge tab to apply a second force, the second force greater than the first force;

wherein controlling the tip-securing fixture to move the trailing edge positioning member into engagement comprises controlling the tip-securing fixture to move the trailing edge positioning member into engagement with the aft side of the trailing edge tab to apply a third force; and wherein moving the trailing edge clamping member into engagement comprises moving the trailing edge clamping member into engagement with the forward side of the trailing edge tab to apply a fourth force, the fourth force greater than the third force.

6. The method of claim 2, wherein controlling the tip-securing fixture to move the leading edge positioning member into engagement with the forward side of the leading edge tab comprises controlling the tip-securing fixture to maintain the leading edge positioning member in a stationary position in response to application of a first threshold amount of force; and wherein controlling the tip-securing fixture to move the trailing edge positioning member into engagement with the aft side of the trailing edge tab comprises controlling the tip-securing fixture to maintain the trailing edge positioning member in a stationary position in response to application of a second threshold amount of force.

7. The method of claim 1, wherein controlling the tip-securing fixture to reengage the tip of the airfoil within the tip-securing fixture comprises controlling the tip-securing fixture to engage the leading edge clamping assembly with the leading edge tab and engage the trailing edge clamping assembly with the trailing edge tab.

8. The method of claim 7, wherein controlling the tip-securing fixture to reengage the tip of the airfoil within the tip-securing fixture comprises controlling the tip-securing fixture to maintain the centering pin in a disengaged state.

9. A fixture system for securing an airfoil during material removal operations, the fixture system comprising:

a root-securing fixture configured to engage a root of the airfoil;

a tip-securing fixture configured to be selectively engageable and disengageable from a tip of the airfoil; and a control system configured to cause the tip-securing fixture to:
  engage the tip during initial removal of material from the airfoil;
  disengage the tip after the initial removal of material to allow movement of the tip from a clamped state position to a free-state position; and
  reengage the tip in the free-state position during additional removal of material from the airfoil;
wherein the tip of the airfoil comprises a plurality of tabs extending from a radially outer edge of the tip of the airfoil within the tip-securing fixture, the plurality of tabs comprising a leading edge tab proximate a leading edge of the airfoil, a trailing edge tab proximate a trailing edge of the airfoil, and a center tab disposed between the leading edge tab and the trailing edge tab, the center tab having a bore extending radially inward from a radially outer side of the center tab;
wherein the tip-securing fixture comprises a leading edge clamping assembly configured to be selectively engageable and disengageable from the leading edge tab, a trailing edge clamping assembly configured to be selectively engageable and disengageable from the trailing edge tab, and a centering pin configured to be selectively inserted into and retracted from the bore of the center tab; and
wherein the control system is configured to:
  cause the tip-securing fixture to engage the tip during the initial removal of material from the airfoil by causing the leading edge claiming assembly to engage the leading edge tab, the trailing edge clamping assembly to engage the trailing edge tab, and the centering pin to insert into the bore of the center tab; and
  cause the tip-securing fixture to disengage the tip after the initial removal of material by causing the leading edge clamping assembly to disengage from the leading edge tab, the trailing edge clamping assembly to disengage from the trailing edge tab, and the centering pin to retract from the bore of the center tab.

10. The fixture system of claim 9,
wherein the leading edge clamping assembly comprises a leading edge positioning member and a leading edge clamping member;
wherein the trailing edge clamping assembly comprises a trailing edge positioning member and a trailing edge clamping member;
wherein the control system is configured to:
cause the centering pin to insert into the bore of the centering tab by causing the centering pin to move into the bore of the centering tab;
cause the leading edge clamping assembly to engage the leading edge tab by causing the leading edge positioning member to move into engagement with a forward side of the leading edge tab and causing the leading edge clamping member to move into engagement with an aft side of the leading edge tab; and
cause the trailing edge clamping assembly to engage the trailing edge tab by causing the trailing edge positioning member to move into engagement with an aft side of the trailing edge tab and causing the trailing edge clamping member to move into engagement with a forward side of the trailing edge tab.

11. The fixture system of claim 10, wherein the control system is configured to cause both the leading edge positioning member and the trailing edge positioning member to move into engagement before causing either of the leading edge clamping member and the trailing edge clamping member into engagement.

12. The fixture system of claim 10, wherein the control system is configured to cause each of the leading edge clamping member and the trailing edge clamping member to move into engagement with the respective one of the leading edge tab and the trailing edge tab by causing each of the leading edge clamping member and the trailing edge clamping member to rotate into alignment with the respective one of the leading edge tab and the trailing edge tab prior to causing each of the leading edge clamping member and the trailing edge clamping member to move into engagement.

13. The fixture system of claim 10, wherein the control system is configured to:
cause the leading edge positioning member to move into engagement by causing the leading edge positioning member to move into engagement with the forward side of the leading edge tab to apply a first force;
cause the leading edge clamping member to move into engagement by causing the leading edge clamping member to move into engagement with the aft side of the leading edge tab to apply a second force, the second force greater than the first force;
cause the trailing edge positioning member to move into engagement by causing the trailing edge positioning member to move into engagement with the aft side of the trailing edge tab to apply a third force; and
cause the trailing edge clamping member to move into engagement by causing the trailing edge clamping member to move into engagement with the forward side of the trailing edge tab to apply a fourth force, the fourth force greater than the third force.

14. The fixture system of claim 10,
wherein the control system is configured to cause the leading edge positioning member to remain in a stationary position in response to application of a first threshold amount of force during engagement with the forward side of the leading edge tab; and
wherein the control system is configured to cause the trailing edge positioning member to remain in a stationary position in response to application of a second threshold amount of force during engagement with the aft side of the trailing edge tab.

15. The fixture system of claim 9,
wherein the control system is configured to cause the tip-securing fixture to reengage the tip in the free-state position during the additional removal of material by causing the leading edge clamping assembly to engage the leading edge tab and the trailing edge clamping assembly to engage the trailing edge tab.

16. The fixture system of claim 15, wherein the control system is configured to cause the tip-securing fixture to reengage the tip in the free-state position during the additional removal of material by maintaining the centering pin in a disengaged state.

* * * * *